United States Patent [19]
Covey

[11] Patent Number: 4,926,476
[45] Date of Patent: May 15, 1990

[54] METHOD AND APPARATUS FOR SECURE EXECUTION OF UNTRUSTED SOFTWARE

[75] Inventor: Carlin R. Covey, Scottsdale, Ariz.

[73] Assignee: Motorola, Inc., Schaumburg, Ill.

[21] Appl. No.: 305,576

[22] Filed: Feb. 3, 1989

[51] Int. Cl.$^5$ .......................... H04L 9/00; H04L 9/02
[52] U.S. Cl. ........................................ 380/4; 364/200; 380/49; 380/50
[58] Field of Search ................ 380/4, 49, 50; 364/200

[56] References Cited

U.S. PATENT DOCUMENTS

| | | |
|---|---|---|
| 3,245,045 | 4/1966 | Randlev . |
| 3,657,699 | 4/1972 | Rocher et al. . |
| 4,120,030 | 10/1978 | Johnstone . |
| 4,278,837 | 7/1981 | Best . |
| 4,319,079 | 3/1982 | Best . |
| 4,685,056 | 8/1987 | Barnsdale et al. . |
| 4,807,288 | 2/1989 | Ugon et al. .............................. 380/4 |

OTHER PUBLICATIONS

D. E. Denning, Communications of the ACM, May 1976, vol. 19, No. 5, p. 236.
B. W. Lampson, Communications of the ACM, Oct., 1973, vol. 16, No. 10, p. 613.

Primary Examiner—Stephen C. Buczinski
Attorney, Agent, or Firm—Frank J. Bogacz

[57] ABSTRACT

A CPU architecture guarantees that untrusted software will handle multi-level classified data in a secure manner. A single copy of untrusted software is granted simultaneous read and write access to multiple levels of classified data, with assurance that both the Bell-LaPadula simple security property and the *-property will be correctly enforced. This enforcement is accomplished without the severe constraints normally imposed by computers that do not incorporate this invention. The technique may also be used to enforce integrity policy constraints alone or in conjunction with security policy constraints (classifications). This method relies upon hardware comparison of sensitivity level tags (and/or integrity level tags) associated with data storage blocks. Software need not be examined before it is permitted to handle multi-level secure data because any attempted violation of a security policy (or an integrity policy) will cause a trap to the trusted operating system. Internal label registers are dynamically updated for permitted accesses by the untrusted software.

23 Claims, 4 Drawing Sheets

METHOD AND APPARATUS FOR SECURE EXECUTION OF UNTRUSTED SOFTWARE

BACKGROUND OF THE INVENTION

The present invention pertains to computer security and more particularly to an arrangement for guaranteeing that untrusted software handles data in a secure fashion.

In today's society computers have become the storage place for virtually all data. For businesses, data stored within a computer may be categorized by type, e.g. "financial data", "technical data", "business plan data", etc. In addition, this data may be classified according to its sensitivity to disclosure, e.g. "public", "proprietary", "highly confidential", etc. Further, computers may contain sensitive government data or software which is classified according to its type and sensitivity.

Such data and software must be protected against read or write access by human users and programs which do not have the appropriate authorization. Such authorization may grant the right to read or write only certain types and sensitivities of data. Enforcing these constraints may be accomplished in two fashions: (1) by testing programs thoroughly to insure that they do not read or write data or programs which they are not permitted to access and (2) by imposing constraints on the software's ability to read or write certain areas of computer memory. Programs which have passed extensive security testing and analysis are called computer security (COMPUSEC) "trusted" programs. Developing and testing COMPUSEC trusted software is very expensive. This development and testing may increase the cost of such software by an order of magnitude. The alternative to this extensive testing and analysis is to impose read and write constraints on the software. Such constraints are typically enforced by a combination of memory management hardware and COMPUSEC trusted software within the operating system. In may cases the functions that the software must perform cannot be accomplished within these constraints, so there is no choice but to develop expensive trusted software. The essence of this invention is to provide memory management hardware that greatly reduces the constraints that must be imposed on the software, thereby allowing the needed software function to be accomplished without requiring the development of trusted software.

Since software today is shared by a large number of users, viruses (programs which damage other programs or data) have proliferated. These viruses read and write information outside the normal bounds of their intended operation. In order to preserve the data's and program's integrity, it is essential that the great body of software that is untrusted be constrained to perform read and write operations in a secure manner.

Accordingly, it is an object of the present invention to provide an apparatus and method for secure execution of untrusted software, obviating the need to develop COMPUSEC trusted software.

SUMMARY OF THE INVENTION

In accomplishing the object of the present invention, a novel method and apparatus for the execution of untrusted software is shown.

The invention is incorporated into a computing system which includes a central processing unit, its internal registers, and a memory, and its memory management unit. The memory management unit controls the access by software processes to storage blocks of the memory. The memory management unit includes segment descriptor or page descriptor registers (collectively referred to as storage block registers) for indicating the location of storage blocks of the memory and the type of access (read, write or execute) allowed for each block.

The basis of the invention is to modify the memory management unit to include variable label registers which correspond to the storage block page registers, and to modify the CPU to include variable label registers which correspond to the CPU's internal registers, and to provide a hardware mechanism that calculates changes in the values in these variable label registers. The invention operates in parallel with the execution of each machine instruction invoked by the software process. For each instruction executed, the label calculation hardware retrieves the label values associated with each of the machine instruction operands. Using these label values, the hardware calculates a new label to assign to each storage block modified by the instruction, and then modifies the associated variable label registers accordingly. The hardware may optionally invoke a trap to the operating system's security kernel to handle exceptional conditions.

DESCRIPTION OF THE PREFERRED EMBODIMENT

Figure 1:
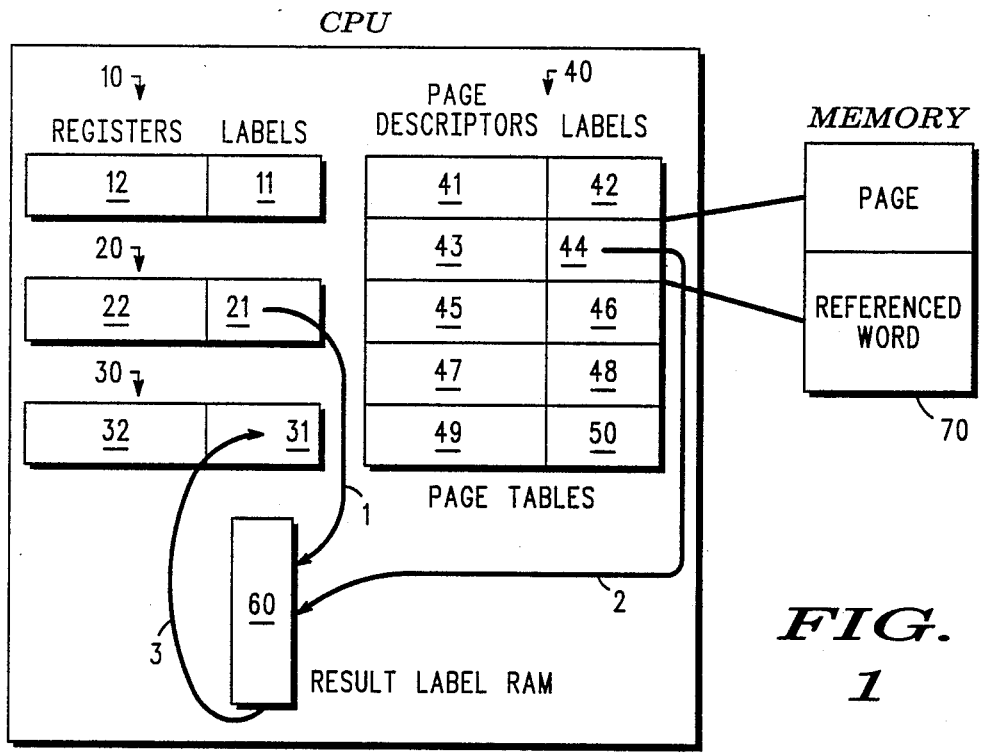
FIG. 1 is a simplified block diagram of the central processing unit (CPU) embodiment of the present invention.

This invention sets forth a hardware mechanism that allows off-the-shelf untrusted software to be treated as though it were trusted to perform correct sensitivity and integrity labeling. This mechanism allows untrusted software to mix multi-level data when appropriate, but prevents the software from mixing multi-level data inappropriately.

Information is often classified according to its sensitivity to disclosure to, or modification by, unauthorized individuals. The classification may include both a hierarchical category ("top secret", "secret", "confidential", "unclassified") and one or more non-hierarchical categories ("NATO", "Nuclear", "Communications", etc.). Each combination of a hierarchical category and a set of non-hierarchical categories constitutes a "sensitivity level". A computer that maintains proper labeling of data at multiple sensitivity levels and proper control of access based upon these labels, is said to be "multi-level secure" or "MLS".

An MLS computer maintains the proper labeling of sensitivity levels via a combination of "trusted" software that is known to preserve this labeling and hardware mechanisms that prevent untrusted software from violating the labeling policy. The hardware mechanisms employed in most MLS computers cannot force untrusted software to label data properly, so instead the mechanisms constrain untrusted software to read data from only certain sensitivity levels and to write data at only certain other sensitivity levels. These levels are chosen so that, despite arbitrary mixing of data within the untrusted software process, the labeling is properly maintained. These constraints are much more restrictive than needed to maintain proper separation, but are necessary because conventional hardware mechanisms cannot prevent untrusted software from mixing data from any sensitivity levels to which the untrusted software has read access. Consequently, all data written by an untrusted process must be presumed to contain data from all sensitivity levels the process can read, and the sensitivity level associated with the output data must reflect this.

The present invention employs a hardware mechanism that permits untrusted software to read from and write to multiple sensitivity levels while at the same time rigorously enforcing proper labeling. Any means unintended by the responsible secure authorities by which data can be mislabeled, is termed a "covert channel". This invention can be used to detect all potential covert storage channels and, in those cases where covert channels must be tolerated, can be used in auditing the use of the covert channels. Another use for the present mechanism is to observe the security behavior of untrusted software under test conditions, in order to develop greater confidence in its continued "good behavior" under field conditions.

The portion of a computer system that is entrusted with enforcing the system's security policy is known as the "Trusted Computing Base" (TCB). A "security kernel" is a particular TCB implementation technique. The TCB enforces security policy by imposing constraints on the accesses that subjects (generally processes or human users) make to "objects" (generally files, I/O devices and memory pages or segments).

A mathematical model of access constraints that has received widespread acceptance is Bell and LaPadula's model of the Multics system. This model represents sensitivity levels as nodes on a lattice. A partial ordering called "dominates" can be defined on the lattice. Sensitivity level A "dominates" sensitivity level B, if A's hierarchical component is greater than or equal to B's, and A's set of non-hierarchical categories includes all of B's non-hierarchical categories. If A does not dominate B, and B does not dominate A, then A and B are said to be non-comparable. Bell and LaPadula's model includes two well-known access constraints that are defined in terms of the dominates relation:

(1) simple security property: a subject may have read access to an object only if the subject's sensitivity level dominates the object's sensitivity level.
(2) *-property: a subject may have append access to an object only if the object's sensitivity level dominates the subject's sensitivity level.

The combined effect of these two constraints is to permit data to flow to higher sensitivity levels while preventing data from flowing to lower sensitivity levels. In the Bell-LaPadula model "untrusted software", i.e., software whose correct security behavior cannot be guaranteed, must be constrained by both properties. "Trusted software", i.e., software that has been subjected to thorough analysis and code control, is known to preserve proper labeling of sensitivity levels. Strict enforcement of the *-property may be relaxed for certain trusted software when necessary to accomplish specific functions.

A human subject (user) is always constrained by the simple security property, i.e., a user is permitted to access only objects whose labels are dominated by a certain sensitivity level reflecting that user's clearances. This is only necessary because it is not possible to prevent a human user from writing high sensitivity information into a low sensitivity storage area. Instead, the human user must be trusted not to do so. The different levels of clearances for human users reflect the different degrees of trust that are placed in users.

A non-human subject (process) need not be constrained by the simple-security property. This is permissible if the process can be prevented from writing high sensitivity information into a low sensitivity storage area (i.e., mislabeling the data). The non-human subject, unlike the human subject, can be forced to obey the *-property. There are two fundamental methods by which the *-property can be enforced: (1) disallow any write operation that would violate *-property, or (2) change the level of the written object to reflect the higher sensitivity level. The present invention supports both of these methods.

The proposed mechanism relies upon sensitivity labels associated with all storage blocks accessible to subject processes (programs). Sensitivity levels are only indirectly associated with subjects. That is, a subject takes on the sensitivity levels of the objects that it accesses. An object is stored in one or more labeled storage blocks. A labeled storage block is defined as an area of data storage with which a single sensitivity level is associated. For the present explanation, a conventional Von Neuman machine will be discussed. However, this invention is not limited to this particular type of machine. A Von Neuman machine consists of a CPU (generally containing several internal registers), and a memory that contains both data and software programs. In the following discussion, the memory is assumed to be divided into many distinct "storage blocks" each containing one or more words of memory. In addition, each register accessible to software programs is considered to be an independent storage block.

The CPU hardware enforces the access control policy by checking the labels associated with each storage block accessed by the software. If the access preserves the simple security and the *-properties, the access is allowed to proceed. If an access would violate either of these properties, the hardware will take one of two actions, as previously selected by the security kernel (operating system). One possible action is to disallow the access and generate a trap to the security kernel for further action by the TCB software. The second possible action is to allow the access to proceed, and have the hardware update the label on the destination storage block(s).

The invention can enforce many different security policies, as selected by the security kernel. The following discussion illustrates how the invention can be utilized to enforce lattice-oriented security policies. The lattice structure is defined by a dominance relation, which is transitive. That is, if level x dominates level y, which in turn dominates level z, then level x also dominates level z. That means that any two levels, say A and B, are dominated by a common level, say C, "higher" in the lattice. If C does not dominate any other level that also dominates A and B, then C is the "least dominating sensitivity level" for A and B. The dominance relation is also associative. That is, the least dominating sensitivity level for any three levels A, B and C can be computed by first calculating the least dominating level for any two of these three levels (call this D), and then calculating the least dominating level for D and the remaining one of the three original levels. This technique can be used to compute the least dominating sensitivity level for any number of levels.

During each instruction execution, the invention computes a least dominating sensitivity level for all source operands of the instruction. For each storage block whose value affects the result of the machine instruction, the value in the corresponding storage block label register is input to the label calculation hardware. The label calculation hardware computes a least dominating sensitivity level for all source operand sensitivity levels. This value is then compared to the sensitivity label stored in the label register associated with the destination operand(s).

If the label of the destination block dominates the hardware-computed least dominating sensitivity level, the operation is always allowed to proceed. If the label of the destination operand strictly dominates (i.e., greater than but not equal to) the least dominating sensitivity level and the destination block will be completely overwritten, then at the security kernel's option, the hardware may lower the destination label to the least dominating sensitivity level. If the level of the storage block dominates, but does not strictly dominate the level of the new data, no label change is needed.

If the label of the destination operand does not dominate the hardware-computed least dominating sensitivity level (and the destination block will not be completely overwritten), the hardware can take one of two actions; (1) it can disallow the operation and generate a trap to the security kernel to take corrective action or (2) it can overwrite the destination label with the newly-computed least-dominating level. If the operation will overwrite all of the destination storage block, then no corrective action is needed; the second of the two actions above is taken.

Referring to FIG. 1, a modified CPU is shown which supports the secure execution of untrusted software. An unmodified CPU would include a number of internal registers 12, 22 and 32, as shown. In conventional CPU's, these registers are loaded and a certain operation performed. No label registers are associated with these internal registers. In the present invention, each internal register 12, 22, 32 has a corresponding label register 11, 21, 31. The pair of registers 11 and 12, is collectively referred to as register 10, 21 and 22 as register 20, and 31 and 32 as register 30. When data is stored into one of the registers 12, 22 or 32, the corresponding label register 11, 21 or 31 is modified in parallel.

The CPU also includes a page table 40. Page table 40 comprises page descriptor registers 41, 43, 45, 47 and 49 and corresponding label registers 42, 44, 46, 48 and 50. Each page descriptor indicates the addresses corresponding to one particular storage block or page of memory 70 and the types of access allowed for that block. Here, pages of memory have been selected as the basic storage block size, however a storage block may be a memory segment, a page or an individual memory location.

Before an untrusted software program begins executing on the CPU, the CPU sets the labels corresponding to the page descriptors for each of the pages of memory 70 that are accessible to the untrusted software program. The page descriptors are loaded into page descriptor registers 41, 43, 45, 47 and 49. The corresponding labels are loaded into label registers 42, 44, 46, 48 and 50. Each program which is allowed to execute on the CPU will have its own set of labels pertaining to the page descriptors that are valid for that program's execution. As the software instructions execute, the result label RAM 60 calculates labels for operation results based upon how the software mixes data from different classification or security levels. Each time one of the registers 10, 20 or 30 is loaded, a new label value is calculated and loaded into the appropriate label register 11, 21 or 31. Each time that data is written into a page of memory, a new label value is calculated and stored into the appropriate page descriptor label register 42, 44, 46, 48 or 50. The page table 40 and the result label RAM 60 comprise a memory management unit. This memory management unit may be implemented within the silicon of conventional CPU chips, so that these modified CPU chips (containing memory management units) are compatible with existing CPU microchips.

Labels of each register and memory page reflect that entity's sensitivity level, integrity level or both. When the CPU executes an instruction, a result label is computed for each of the registers or pages that may be modified by the instruction. If a *-violation would result from the operation, either the write operation is prevented and a trap to the operating system is generated or the write is allowed and the label of the destination is modified. This result label is calculated by using the register labels 21, path 1, etc. and page labels 44, path 2, etc. as an address to result label RAM 60. Result label RAM 60 contains prestored resulting labels for each of the possible sets of labels input to it. In the simplest implementation, this RAM must provide enough address inputs to accommodate two operands (the label operand from the appropriate register, path 1 and the label operand from the appropriate page descriptor, path 2). The resultant label is output by RAM 60 to the appropriate label register, path 3, to be modified, 31. If more than two source operands are used in a particular function, the result label may be computed by taking two operands at a time.

Before giving execution control to a particular software process, the security kernel (operating system) changes the values of result label RAM 60 in order to enforce different security policies at different times or to impose different constraints upon different processes or to accommodate different classification schemes.

The number of sensitivity levels that may be handled at any one time is determined by the size of the result label RAM. This result label RAM could be implemented via a simple random-access memory, but it may also be implemented via a programmable logic array, a gate array, a content-addressable impose memory (CAM) or via any of a variety of associative memory or programmable logic techniques. The term "result label RAM" shall be taken to mean any of these implementation techniques. In particular, an attractive implementation would be an associative memory cache that would store several sets of three labels. Two of the three labels in each set would be access keys for the associative memory cache. The third label in each set would be the returned result label. When two label values are presented to the result label RAM (via paths 1 and 2 in FIG. 1) the associative memory will determine whether it has stored a set which has these two label values as access keys. If so, the result label is returned from this set via path 3. If the associative memory does not have a set which corresponds to these access keys, then this set must be retrieved from main memory. This could be accomplished by the memory management unit, or by generating a trap to the CPU so that the operating system can retrieve the needed label set. The needed set would then be loaded in the result label RAM. If no space is available in the result label RAM, then any of a number of cache replacement algorithms may be applied.

The foregoing text described the simplest implementation of the invention. This patent application shall also encompass the following more elaborate implementations of the invention. The design of the label calculation hardware (i.e., the result label RAM) may be such that the calculated label is a function not only of one or more source operand labels, but also any combination of the following:

(1) the value of one or more source operands
(2) the identifier of one or more storage blocks containing source operands
(3) the value of one or more results of the operation
(4) the identifier of one or more storage blocks where the results of the operation will be placed
(5) the present or past internal state of the CPU's control logic, including the type of operation being performed.

The additional inputs to the label calculation hardware may be used as illustrated in the following examples. These illustrative examples do not constitute limitations on the claims made under this patent application.

Example (1): The value of a particular source operand, in conjunction with knowledge of the particular U operation being performed, may be taken into account by the label calculation hardware. For example, if a Boolean "OR" operation is performed and one of the source operands is a logic "1", then the value of the other source operand will not affect the result. As a consequence, the label calculation hardware may attach the label on the "1" operand to the result, without regard to the label on the second source operand. If both source operands have value "1", the hardware may use the "lower" sensitivity label of the two operands.

Example (2): If the operation to be performed is a conditional branch of program flow, then the label calculator may assign a label to the program counter that dominates the labels of the branch condition operands. The program counter label is considered to be a source operand when calculating subsequent result labels.

Figure 2A:
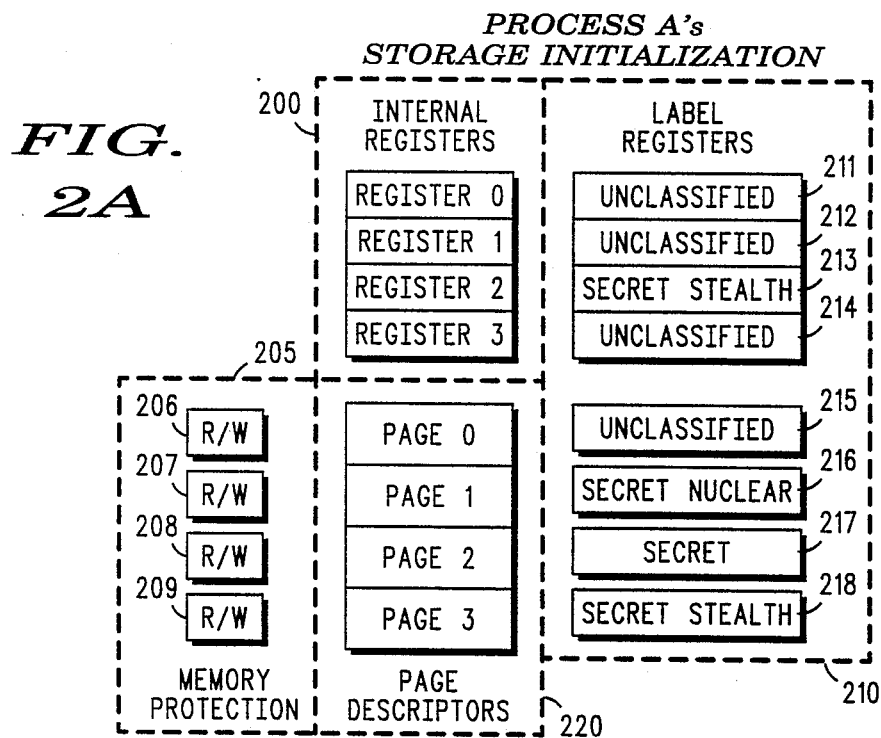
FIGS. 2A and 2B are block diagrams of the CPU configuration and data flow at the initiation of a particular process.

FIG. 2A depicts a sample process (process A) and its particular storage block (registers and pages) at initialization setup. This initialization includes internal registers 200 including registers 0–3. Also, included is a set of label registers 210. Label registers 211 through 214 correspond to internal registers 0–3.

Page descriptors 220 contain the location information concerning each of the memory pages. Page descriptors 220 include page registers 0–4. Label registers 215–218 correspond to page registers 0–4. Memory protection indication 205 includes registers 206–209. Registers 206–209 correspond to page registers 0–3, respectively.

Label registers 211, 212 and 214 indicate that internal registers 0, 1 and 3 are unclassified registers at the present time. Read/write indicators 206–209 indicate that pages 0–3 may be both read from and written to by process A. Label register 213 indicates that register 2 is a "secret stealth" level register. Label register 215 indicates that page 0 of memory is unclassified. Label register 216 indicates that page 1 of memory is "secret nuclear" level classification. Label register 217 indicates that page 2 is classified at the "secret" level. Label register 218 indicates that page 3 is classified at the "secret stealth" level.

Figure 2B:
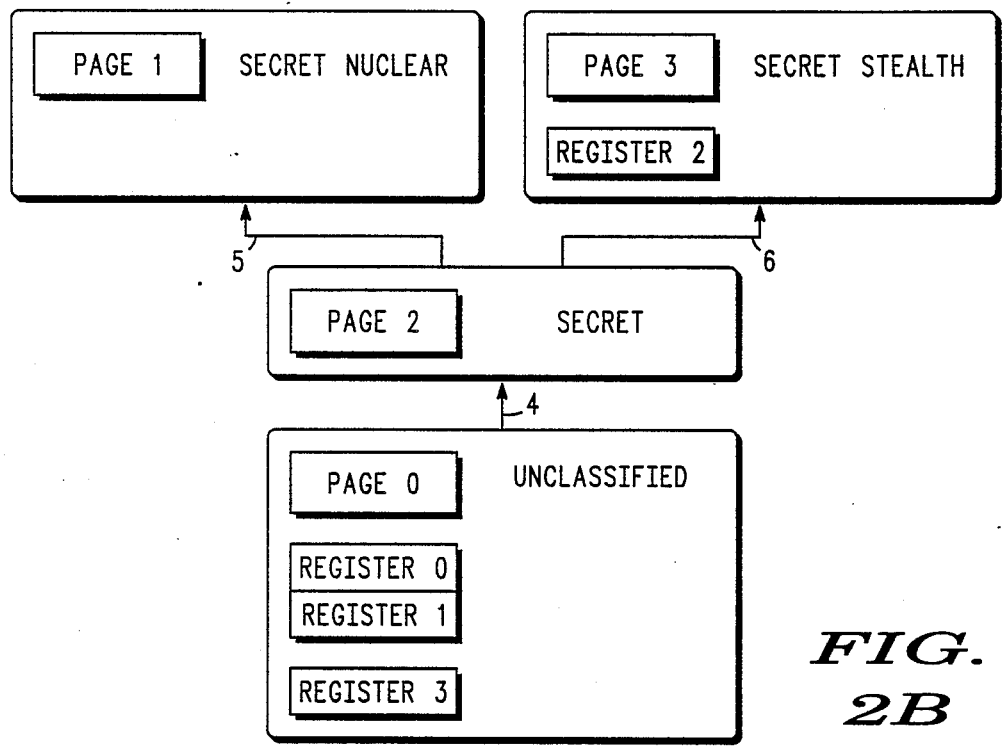

Referring to FIG. 2B, a security level lattice indicating permissible data flow for process A is shown. As indicated in FIG. 2A, page 0 of memory and internal registers 0, 1 and 3 are unclassified. The unclassified level is dominated by the secret level as indicated by path 4. Page 2 of memory is at the secret level.

The secret level is dominated by two independent secret level classifications, secret nuclear and secret stealth. Page 1 of memory is classified at the secret nuclear level. Page 3 of memory and internal register 2 are classified at the secret stealth level. The dominance of the secret level by the secret nuclear and secret stealth levels is indicated by paths 5 and 6, respectively.

Figure 4A:
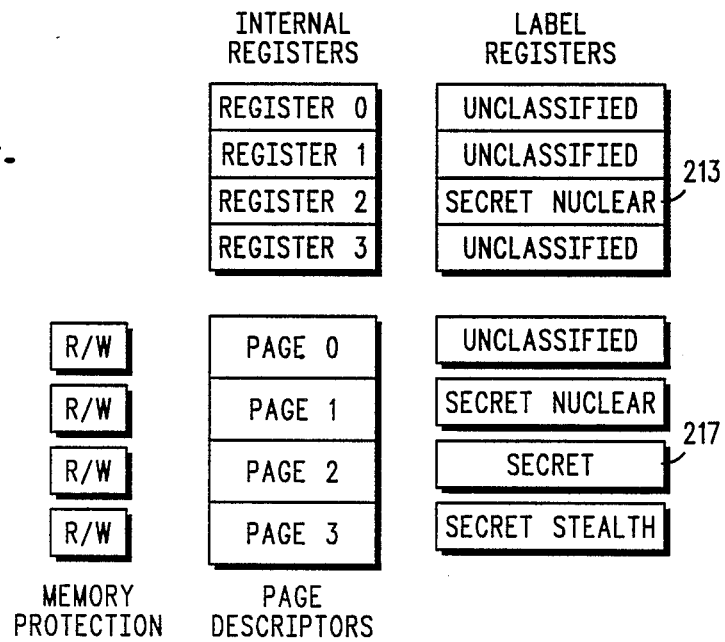
FIGS. 4A and 4B are block diagrams of the CPU and data flow after register 2 is loaded from page 1.
Figure 4B:
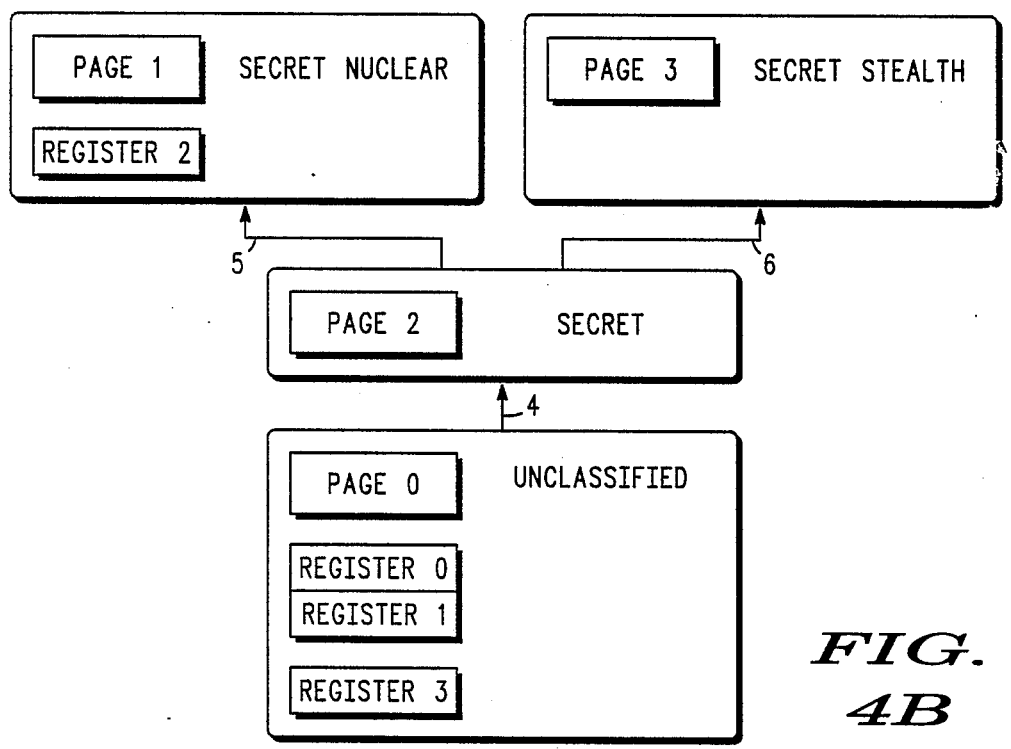

The dominance relations indicated by the lattice shown in FIG. 2B are preprogrammed and stored into result label RAM 60 of FIG. 1 by the security kernel, in advance of process A's execution. The label registers have also been loaded in advance by the security kernel, or hardware acting on its behalf. FIGS. 4A and 4B correspond to FIGS. 2A and 2B, except that FIGS. 4A and 4B depict process A's storage block indications and lattice level arrangement after process A has loaded internal register 2 from page 1 of memory. Loading register 2 caused the "secret stealth" contents of the register to be replaced with "secret nuclear" data from page 1 of memory. Since there was no secret stealth data remaining in register 2, the label calculation hardware calculated that the least dominating sensitivity level for the operation was "secret nuclear", the level of the single source operand. Accordingly, the hardware has updated register 213 to reflect the "secret nuclear" level of register 2.

Figure 3A:
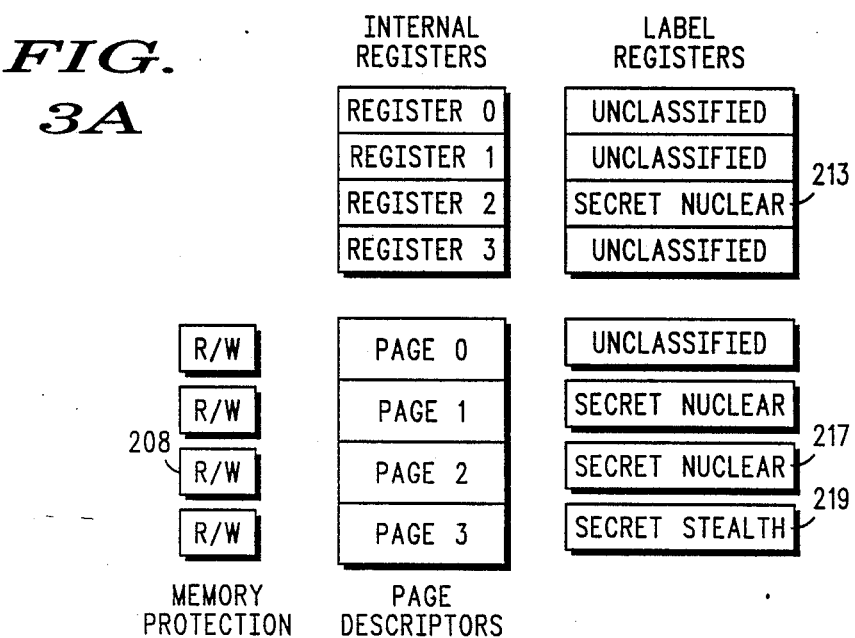
FIGS. 3A and 3B are block diagrams of the CPU and data flow after the execution of untrusted of a particular process.
Figure 3B:
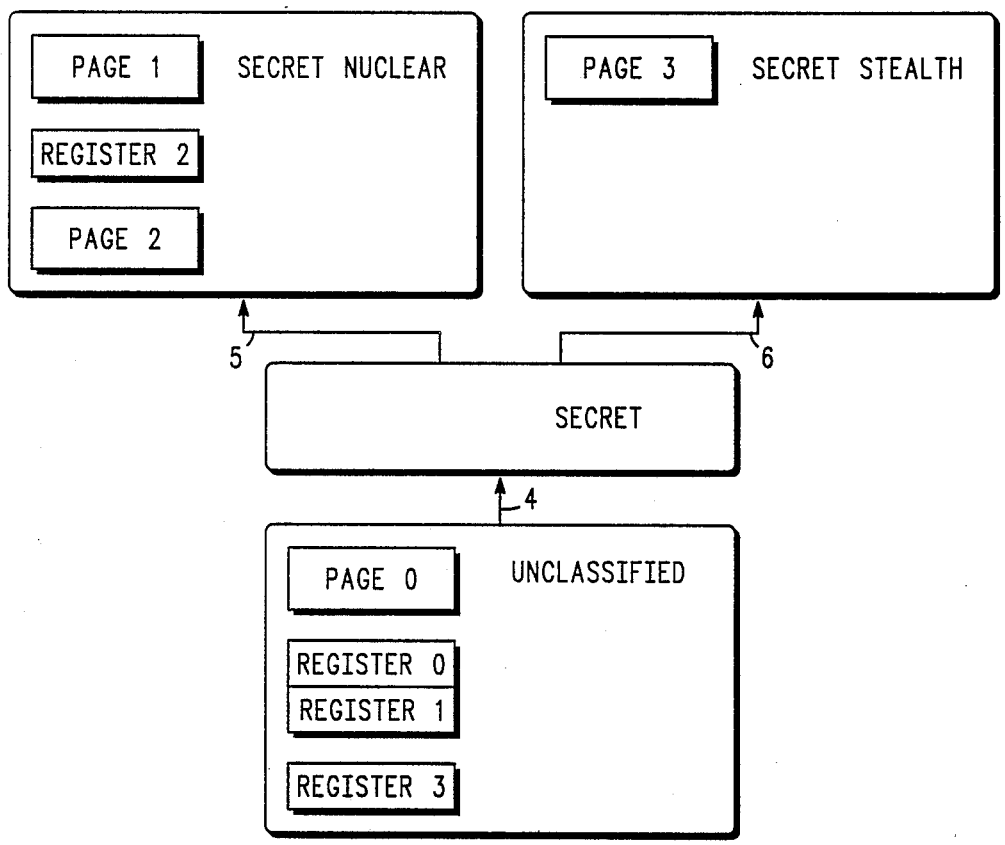

FIGS. 3A and 3B represent process A's storage block indications and the corresponding lattice arrangement following the execution of an additional instruction. The state of the registers is the same as in FIGS. 4A and 4B except for those changes which result from storing register 2 into page 2.

As can be seen from FIG. 3A, the label register 213 associated with register 2 indicated that the contents of register 2 were classified at the secret nuclear level as a result of the instruction execution depicted in FIGS. 4A and 4B. Storing data from register 2 into page 2 results in a mixture of data in page 2. Since the "secret" data in page 2 was not completely overwritten, page 2 now contains both "secret" data and "secret nuclear" data. Accordingly, the result label calculation hardware regards both register 2 and the original data of page 2 as source operands, and computes a least dominating sensitivity level for "secret nuclear" and "secret". This least dominating sensitivity level is "secret nuclear". Therefore, in FIG. 3B, page 2 has been raised in the security lattice from the secret level shown in 4B to the secret nuclear level shown in FIG. 3B. Note that the label register 217 which is the label register for page 2 now indicates a secret nuclear level as shown in FIG. 3A. Note that in FIG. 4A, register 217 indicates that it was at the secret level. Referring again to FIG. 4A, it will be shown how the status of page 2's level register 217 was changed from secret to secret nuclear as shown in FIG. 3A. In FIG. 4A, the label register 213 pertinent to register 2 indicated that register 2 is at the secret nuclear classification level. Page 2 of memory is indicated as at the secret level by label register 217. Label registers 213 and 217 were input to result label RAM 60 of FIG. 1. Since page 2 is to be modified, RAM 60 outputs the new label value to label register 217 which corresponds to the new classification status of page 2 of memory. Thus, the new level secret nuclear is written into label register 217 and the resultant configuration is shown in FIGS. 3A and 3B.

The above change of label register 217 was programmed by transferring process A's label table to RAM 60 before process A began. This table indicates that "secret nuclear" is the least dominating level for "secret" and "secret nuclear". The table loaded into RAM 60 may indicate that certain types of operations are not permitted. In such a case, the hardware would detect the nonpermitted operation and would initiate a trap to the security kernel. If, for example, information was to be written from register 2 (secret nuclear), to page 3 (secret stealth), the contents of label registers 213 and 219 would be input to label RAM 60. This transfer would not be allowed because process A is not allowed to mix "secret nuclear" data with "secret stealth" data. If this were allowed, RAM 60 would be programmed with the knowledge of the least dominating sensitivity level for this mixture of levels. Instead, the result output from label RAM 60 would cause a trap to the security kernel (operating system).

As can be seen from the above, an unlimited number of classification labels or integrity labels may be applied to any system. The preprogramming of the label RAM 60 and initialization of each of the label registers may be changed for each software process. The same bit patterns in these registers may have different significance to different software processes. The security kernel will select the particular bit patterns that it will use to represent different sensitivity and/or integrity levels, and will program the result label RAM and label registers accordingly. Each of the label registers is dynamically variable during the execution or run time of a particular software process. However, the processes may be initialized only by the trusted computing base's security kernel (operating system). This is enforced by permitting the programming of the result label RAM and the label registers only when the CPU is in supervisor mode. The hardware constrains entrance into supervisor mode so that only the security kernel can execute in this mode.

As previously indicated, the above invention eliminates the need for developing versions of each software application program that are trusted to properly label data sensitivity or integrity. The present invention may be used to enforce correct labeling of multi-level classified data in: main frame computers, minicomputers, microcomputers, computer work stations, communication processors and embedded processors.

As previously mentioned, this invention may be placed into the silicon of microprocessor chips such as Motorola's MC68000 or 88000 family processors. However, this invention is not limited to those processors. Since this invention pertains to the hardware microprocessor of a computer, only a minimal level of trusted software must be developed. Various off-the-shelf software may be run on this system without the extensive testing required to put trust in trusted software.

This invention may be used with upgraded versions of such operating systems as the secure Xenix operating system on IBM type personal computers or the VMS or Unix operating systems on VAX computers produced by Digital Equipment or the above-mentioned Multics system produced by Honeywell.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a processing system including a security kernel, a central processing unit (CPU), internal registers, a memory, and a memory management unit for controlling the access to storage blocks of said memory by a software process, said memory management unit comprising:

page register means for indicating a location of each of said storage blocks of said memory;

variable label register means corresponding to said internal registers of said CPU and corresponding to said page register means, said variable label register means providing first and second address inputs in response to an instruction execution by said software process; and label calculation means connected to said variable label register means, said label calculation means providing an output in response to said first and second address inputs of said variable label register, said output updating said variable label register means for an allowed access to said memory by said software process, and said output further trapping to said security kernel for a non-allowed access to said memory by said software process.

2. A memory management unit as claimed in claim 1, said page register means including a plurality of page descriptor means.

3. A memory management unit as claimed in claim 2, said variable label register means including:

first plurality of variable label register means corresponding one-to-one to a plurality of internal registers of said CPU; and second plurality of variable label register means corresponding one-to-one to said plurality of page descriptor means.

4. A memory management unit as claimed in claim 3, said label calculation means being connected to each of said first and second pluralities of variable label register means, said label calculation means operating in response to said first and second address inputs to produce said output for dynamically modifying one of said first and second plurality of variable label register means for an allowed access to said storage blocks by said software process, said label calculation means alternately operating in response to said first and second address inputs to produce said output for trapping to said security kernel for said non-allowed access to said storage blocks of said memory by said software process.

5. A memory management unit as claimed in claim 4, said label calculation means including random access memory (RAM) means operating in response to said first and second address inputs applied as an address.

6. A memory management unit as claimed in claim 4, said label calculation means including content addressable memory means.

7. A memory management unit as claimed in claim 4, said label calculation means including associative memory means.

8. A memory management unit as claimed in claim 4, said label calculation means including programmable logic means.

9. A memory management unit as claimed in claim 4, said label calculation means including gate array means.

10. In a processing system including a CPU, memory, a plurality of internal registers and a security kernel, a memory management method for controlling the access to storage blocks of said memory by software process, said memory management method comprising the steps of:
   setting a plurality of page registers corresponding to said storage blocks of said memory;
   initializing a plurality of variable label registers and a label memory;
   addressing said label memory with contents of at least one of said label registers in response to an instruction execution by said software process for access to said storage blocks;
   updating at least one of said label registers with a result status obtained in response to said contents of said label registers for an allowed access by said software process to said storage blocks; and
   trapping to said security kernel for a non-allowed accesses to said storage blocks by said software process.

11. A memory management method as claimed in claim 10, said step of initializing including the steps of:
   first initializing a plurality of said variable label registers corresponding to said plurality of page registers to predefined values;
   second initializing said plurality of variable label registers corresponding to said internal registers to predefined values; and
   third initialing said label memory to predefined values.

12. A memory management method as claimed in claim 11, said step of updating including the steps of:
   reading a contents from said label memory corresponding to said input variable label registers; and
   storing said contents into a particular one of said variable label registers for a permitted access to said storage blocks by said software process.

13. A memory management method as claimed in claim 12, where there is further included the step of iterating said steps of addressing, reading and storing a predetermined number of times corresponding to particular instructions executed of said software process.

14. A memory management method as claimed in claim 13, said step of trapping including the step of transferring control from said software process to said security kernel for the detection of an access to non-allowed storage blocks by said software process.

15. In a microprocessor CPU including internal registers, a security kernel and a memory management unit for providing controlled access to storage blocks memory by a software process, said memory management unit comprising:
   page register means for indicating the location of said storage blocks of memory;
   variable label register means corresponding to said page register means and to said internal registers, said variable label register means providing first and second address inputs in response to an instruction execution of said software process; and
   label calculation means connected to said variable label register means, said label calculation means providing an output in response to said first and second inputs of said variable label register means, said output updating said variable label register means for an allowed access to said memory by said software process, said output trapping to said security kernel for a non-allowed access to said memory by said software process.

16. A memory management unit as claimed in claim 15, said page register means including a plurality of page descriptor means.

17. A memory management unit as claimed in claim 16, said variable label register means including:
   first plurality of variable label register means corresponding one-to-one to a plurality of internal registers of said CPU; and
   second plurality of variable label register means corresponding one-to-one to said plurality of page descriptor means.

18. A memory management unit as claimed in claim 17, said label calculation means being connected to each of said first and second pluralities of variable label register means, said label calculation means operating in response to said first and second address inputs to produce said output for dynamically modifying one of said first and second plurality of variable label register means for an allowed access to said storage blocks by said software process, said label calculation means alternately operating in response to said first and second address inputs to produce said output for trapping to said security kernel for said non-allowed access to said storage blocks of said memory by said software process.

19. A memory management unit as claimed in claim 18, said label calculation means including random access memory (RAM) means operating in response to said first and second address inputs applied as an address.

20. A memory management unit as claimed in claim 18, said label calculation means including content addressable memory means.

21. A memory management unit as claimed in claim 18, said label calculation means including associative memory means.

22. A memory management unit as claimed in claim 18, said label calculation means including programmable logic means.

23. A memory management unit as claimed in claim 18, said label calculation means including gate array means.

* * * * *

UNITED STATES PATENT AND TRADEMARK OFFICE
CERTIFICATE OF CORRECTION

PATENT NO. : 4,926,476
DATED : May 15, 1990
INVENTOR(S) : Carlin R. Covey

It is certified that error appears in the above-identified patent and that said Letters Patent is hereby corrected as shown below:

In column 11, claim 11, line 35, delete the word "initialing" and substitute --initializing--.

Signed and Sealed this

Thirtieth Day of July, 1991

Attest:

HARRY F. MANBECK, JR.

*Attesting Officer*      *Commissioner of Patents and Trademarks*